(12) United States Patent
Weed et al.

(10) Patent No.: US 6,481,479 B1
(45) Date of Patent: Nov. 19, 2002

(54) HIGH ASPECT AGRICULTURAL OR OFF-ROAD TIRE

(75) Inventors: David Busse Weed, Mogadore, OH (US); Andrew Caperton Shorter, Cuyahoga Falls, OH (US); Steven George Bishel, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/462,398

(22) PCT Filed: Aug. 25, 1997

(86) PCT No.: PCT/US97/14936

§ 371 (c)(1),
(2), (4) Date: Jan. 6, 2000

(87) PCT Pub. No.: WO99/10190

PCT Pub. Date: Mar. 4, 1999

(51) Int. Cl.[7] .................. B60C 11/11; B60C 107/02; B60C 121/00
(52) U.S. Cl. ................. 152/209.12; 152/454
(58) Field of Search .............. 152/209.1, 209.12, 152/209.13, 454

(56) References Cited

U.S. PATENT DOCUMENTS

| | | | |
|---|---|---|---|
| 1,969,088 A | 8/1934 | Maranville | 152/13 |
| 2,150,107 A * | 3/1939 | Shields | 152/209.12 |
| 2,271,337 A | 1/1942 | Hale et al. | 152/209 |
| 3,164,193 A | 1/1965 | Uotani et al. | 152/356 |
| 3,547,175 A | 12/1970 | Verdier | 152/209 |
| 3,916,968 A | 11/1975 | Masson | 152/353 |
| 4,328,850 A | 5/1982 | Uemura | 152/209 R |
| 4,436,127 A | 3/1984 | Balbis et al. | 152/209 R |
| 4,446,902 A * | 5/1984 | Madec et al. | 152/209.12 |
| 4,791,971 A * | 12/1988 | Shinn | 152/209.12 |
| 5,360,044 A | 11/1994 | Saito et al. | 152/209 R |
| 5,411,067 A * | 5/1995 | Beeghly et al. | |
| D363,907 S | 11/1995 | Bonko | D12/151 |

FOREIGN PATENT DOCUMENTS

| | | |
|---|---|---|
| CH | 209 253 | 6/1940 |
| DE | 29 26 159 | 1/1980 |
| EP | 0600265 | 6/1994 |
| FR | 1569597 | 6/1969 |
| FR | 2 672 847 | 8/1992 |
| GB | 1418781 | 12/1975 |
| JP | 62-4604 * | 1/1987 |
| JP | 3-231001 * | 10/1991 |
| JP | 6-48108 * | 2/1994 |

OTHER PUBLICATIONS

Clark, *Mechanics of Pneumatic Tires*, pp. 216–225, Aug. 1981.*

Wormley, "New: radial tires for tractors", Farm Journal, p. 29, Dec. 1973.*

* cited by examiner

*Primary Examiner*—Steven D. Maki
(74) *Attorney, Agent, or Firm*—David L. King

(57) ABSTRACT

As agricultural tire 20 for the driveaxle of a vehicle has an aspect ratio of greater than 95%. The tire 20 has a nominal rim diameter of 20 inches or greater.

3 Claims, 5 Drawing Sheets

HIGH ASPECT AGRICULTURAL OR OFF-ROAD TIRE

TECHNICAL FIELD

This invention relates to agricultural or off-road tires. More particularly to high aspect ratio tires in that field.

BACKGROUND OF THE INVENTION

Pneumatic tires generally have a tread overlaying a casing. The casing includes a belt or breaker structure. The carcass has at least one cord reinforced ply anchored to two annular substantially inextensible beads.

In radial tires, the carcass has at least one radial ply. In bias tires the carcass has at least two plies of equal but opposite orientation. In both cases the belts of radial tires or the breakers of bias tires prevents or restrict the growth of the tire when inflated. In automobile and truck tires, the ratio of section height divided by section width is usually much less than 95%, typically, in the range of 35% to 85%.

Agricultural or off-road vehicles generally have similar aspect ratios below 95%. In order to increase the load carrying capacity of such tires designers generally have required increasing the width of the tire while maintaining the same nominal rim diameter or simply increasing the tires overall size generally. This is so because the load carrying capacity of these tires is related to the air chamber capacity at a given inflation pressure. Another way to increase load carrying capacity is to increase the tire inflation pressure. This solution is commonly practiced in aircraft and earthmover and heavy construction equipment tires where the inflation pressure is up to 300 psi.

In agricultural tires, it is desirable to operate the tires at low pressure. This enables the tire to reduce soil compaction while improving the drawbar traction. In such a case, it is necessary to increase the air chamber volume to increase load capacity. This has meant in the past, increasing the tires section width, but wide tires means reduced crop yields once the crop is planted. One solution has been the development of narrow row crop tires. Such a tire is shown in U.S. design patent. These tires are narrow in width and have an aspect ratio up to 95%.

The inventors of the present invention have discovered that the use of ultra high aspect ratio agricultural or off-road tires can provide increased load carrying capacity at reduced operating pressures while increasing the tractive efficiency of the vehicle.

One of the objectives of the invention is to provide a pneumatic tire that can simulate the traction performance of tracked vehicles.

Another objective is to provide a ire having a reduced spring rate and improved vibration damping characteristic resulting in a softer ride performance tire. The objects being satisfied by the inventive tire described below.

SUMMARY OF THE INVENTION

An agricultural or off-road tire 20 for the drive axle or axles of a vehicle, is disclosed. The tire has an axis of rotation, a nominal rim diameter NRD of 20 inches or greater, and a carcass 21. The carcass 21 has at least one cord reinforced ply 22 and a pair of annular bead cores 24. A tread 32 is disposed radially outward of the carcass 21.

The tire 20 has an aspect ratio of greater than 95%, preferably 100% or greater most preferably greater that 100%.

The tire 20 has a contact patch when the tire is inflated to less than 16 psi and loaded on a hard flat surface, the contact patch having an axial width X and circumferential length of Y, wherein the ratio of Y/X is at least greater than 1.0. Preferably the contact patch has a leading end and a trailing end; the distance between the leading and trailing end defines the circumferential length Y. The tire 20 when inflated to less than 16 psi and normally loaded has a first radial line intersecting the leading end and a second radial line intersecting the trailing end.

The tire can have a carcass having one or more radial plies and a belt reinforcing structure between the ply or plies and the tread. Alternatively, the carcass can have two or more bias plies and a breaker structure between the tread and the bias plies.

The tread has a plurality of lugs spaced between a pair of lateral edges. Each lug has a radially outer contact surface area, the sum of the radially outer contact surface areas between the lateral edges as measured around the total circumference of the tire divided by the area between the lateral edges around the total tires circumference is less than 40%, preferably less than 30%.

DEFINITIONS

"Aspect ratio," means the ratio of its inflated section height to its inflated section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by or anchored to ply cords and shaped, with or without other reinforcement elements such as flippers, chippers, apexes or fillers, toe guards and chafers, the bead or beads under the tread being encapsulated in tread rubber can be with or without other cord reinforced fabric elements.

"Belt Structure" or Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply tire" means that the reinforcing cords in the carcass ply extend diagonally across the tire from bead-to-bead at about a 25–65° angle with respect to the equatorial plane of the tire, the ply cords running at opposite angles in alternate layers.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction.

"Design Rim" means a rim having a specified configuration and width. For the purposes of this specification, the design rim and design rim width is as specified by the industry standards in effect in the location in which the tire is made. For example, in the United States, the design rims are as specified by the Tire and Rim Association. In Europe, the rims are as specified in the European Tyre and Rim Technical organization-Standards Manual and the term design rim means the same as the standard measurement rims. In Japan, the standard organization is The Japan Automobile Tire Manufacturer's Association.

"Design Rim Width" is the specific commercially available rim width assigned to each tire size and typically is between 75% and 90% of the specific tire's section width.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Inner" means toward the inside of the tire and "outer" means toward its exterior.

"Lateral Edge" means the axially outermost edge of the tread as defined by a plane parallel to the equatorial plane and intersecting the outer ends of the axially outermost traction lugs at the radial height of the inner tread surface.

"Leading" refers to a portion of part of the tread that contacts the ground first, with respect to a series of such parts or portions, during rotation of the tire in the direction of travel.

"Net-to-gross Ratio" means the ratio of the tread contacting surface area of the normally loaded and inflated tire to the total area of the tread, including non-contacting portions such as grooves as measured around the entire circumference of the fire.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Radial" and "radially" means directions radially toward or away from the axis of rotation of the tire.

"Radial Ply Tire" means a belted or circumferentially-restricted pneumatic tire in which the ply cords which extend from bead to bead are laid at cord angles between 65° and 90° with respect to the equatorial plane of the tire.

"Section Height (SH)" means the radial distance from the nominal rim diameter to the outer diameter of the tire at its equatorial plane.

"Section Width (SW)" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Tire Design Load" is the base or reference load assigned to a tire at a specific inflation pressure and service condition; other load-pressure relationships applicable to the tire are based upon that base or reference.

"Trailing" refers to a portion or part of the tread that contacts the ground last, with respect to a series of such parts or portions during rotation of the tire in the direction of travel.

"Tread Arc Width (TAW)" means the width of an arc having its center located on the plane (EP) and which substantially coincides with the radially outermost surfaces of the various traction elements (lugs, blocks, buttons, ribs, etc.) across the lateral or axial width of the tread portions of a tire when the tire is mounted upon its designated rim and inflated to its specified inflation pressure but not subject to any load.

"Tread Width" means the arc length of the tread surface in the axial direction, that is, in a plane parallel to the axis of rotation of the tire.

"Unit tread Pressure" means the radial load borne per unit area (square centimeter or square inch) of the tread surface when the area is in the footprint of the normally inflated and normally loaded tire.

BRIEF DESCRIPTION OF DRAWINGS

The following is a brief description of the drawings in which like parts bear like reference numerals and in which.

DETAILED DESCRIPTION OF THE INVENTION

Figure 2:
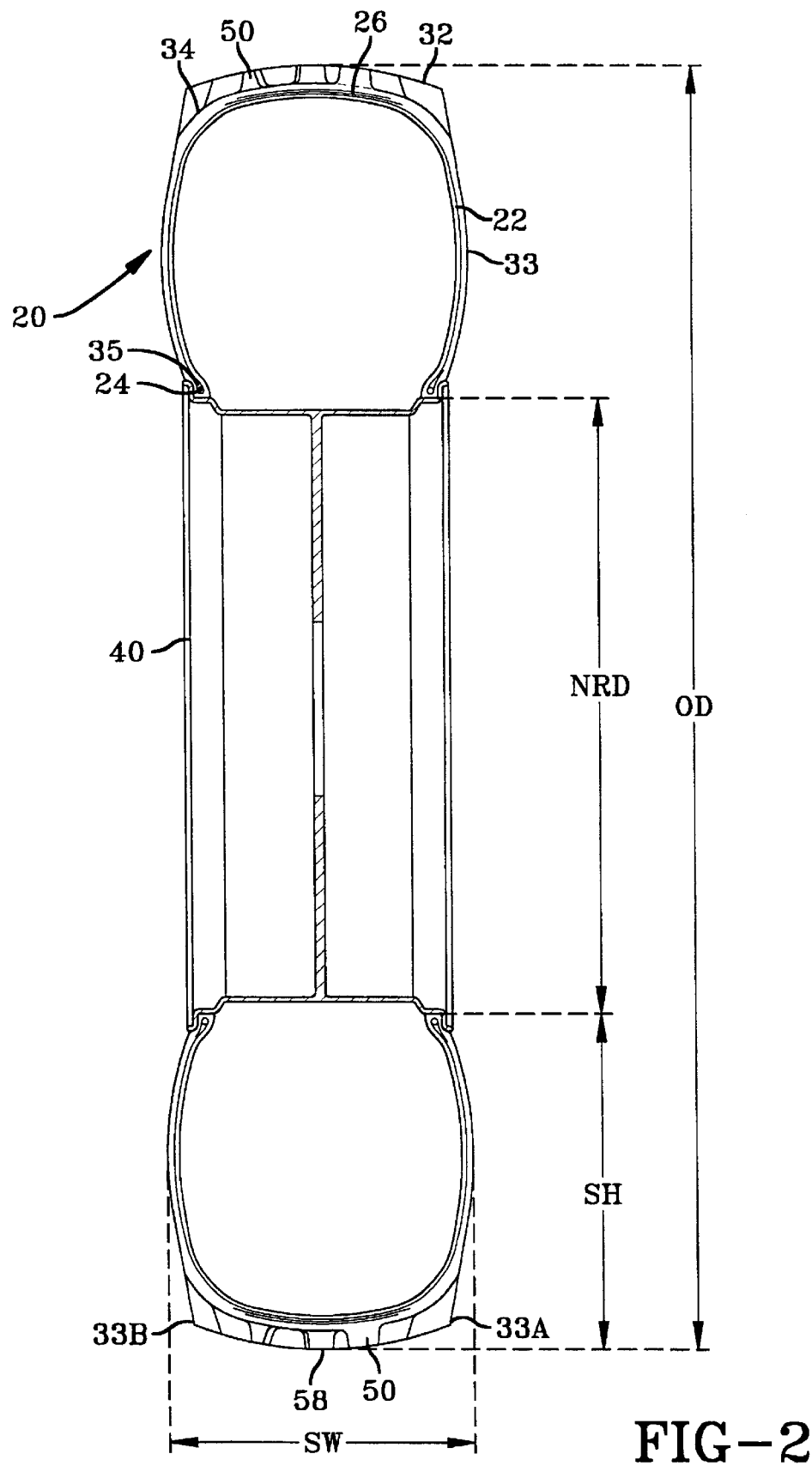
FIG. 2 is a cross sectional view of the tire of FIG. 1.

Now referring to FIG. 2 a tire is shown in cross-sectional view generally as reference numeral 20. The tire has a carcass 21 having one or more carcass plies 22 extending circumferentially about the axis rotation of the tire. As illustrated, the tire preferably has 3 to 4 cord reinforced plies having synthetic nylon or polyester cords. The carcass plies are anchored around a pair of substantially inextensible annular bead cores 24. A belt-reinforcing member 26 has one or more belt or breaker plies disposed radially outward from the carcass plies. Preferably four belts are employed. The belts being of polyester, nylon or aramid cord reinforcement alternatively the cords can be of ultra high tensile monofilament steel cord reinforcement. These belt plies provide reinforcement for the crown region of the tire 20. A circumferentially extending tread 32 is located radially outwardly of the belt reinforcing structure 26.

A sidewall portion 33 extends radially inwardly from each axial or lateral tread edge 33A,33B of the tread to an annular bead portion 35 having the beads 24 located therein. Carcass plies 22 preferably have the cords oriented radially. The number of plies depends on the load carrying requirements of the tire. This tire carcass and belt structure as shown in FIG. 2 is equally applicable for use in any of the embodiments of the present invention. FIGS. 1–3 and 5–7 illustrate high aspect tires made in accordance to the present invention, whereas FIG. 4 illustrate this having normal aspect ratio.

Now referring to FIGS. 1–5, a tire 20 according to the present invention, is illustrated. The tire 20 according to the present invention as a tread 32. The tread 32 has a first tread edge 33A and a second tread edge 33B. Disposed between the tread edges 33A and 33B is an inner tread 34 and a plurality of lugs 50 extending radially outwardly from the inner tread 34. As illustrated in FIG. 2 each lug 50 has a radially outer surface 58, the total area of these surfaces 58 define the net contact area of the tread 32 when the tread is loaded onto a hard flat surface. The total area between the lateral edges 33A, 33B of the tread 32 as measured around the 360° circumference of the tread defines the gross area; the net area divided by the gross area defines the net to gross ratio.

For off-the road tire, this is usually 50% or less for agricultural tires the net to gross ratio is generally 40% or less typical less than 30%.

These tread lugs 50 provide the traction for the tire. Each lug 50 has a leading edge side 52 and a trailing edge side 54. Normally these lugs are arranged within a directional pattern providing the optimum tractive capability as the tire rotates in a forward direction. The leading edge side penetrates the soil and provides a surface, which pushes against the soil propelling the vehicle forward.

Figure 1:
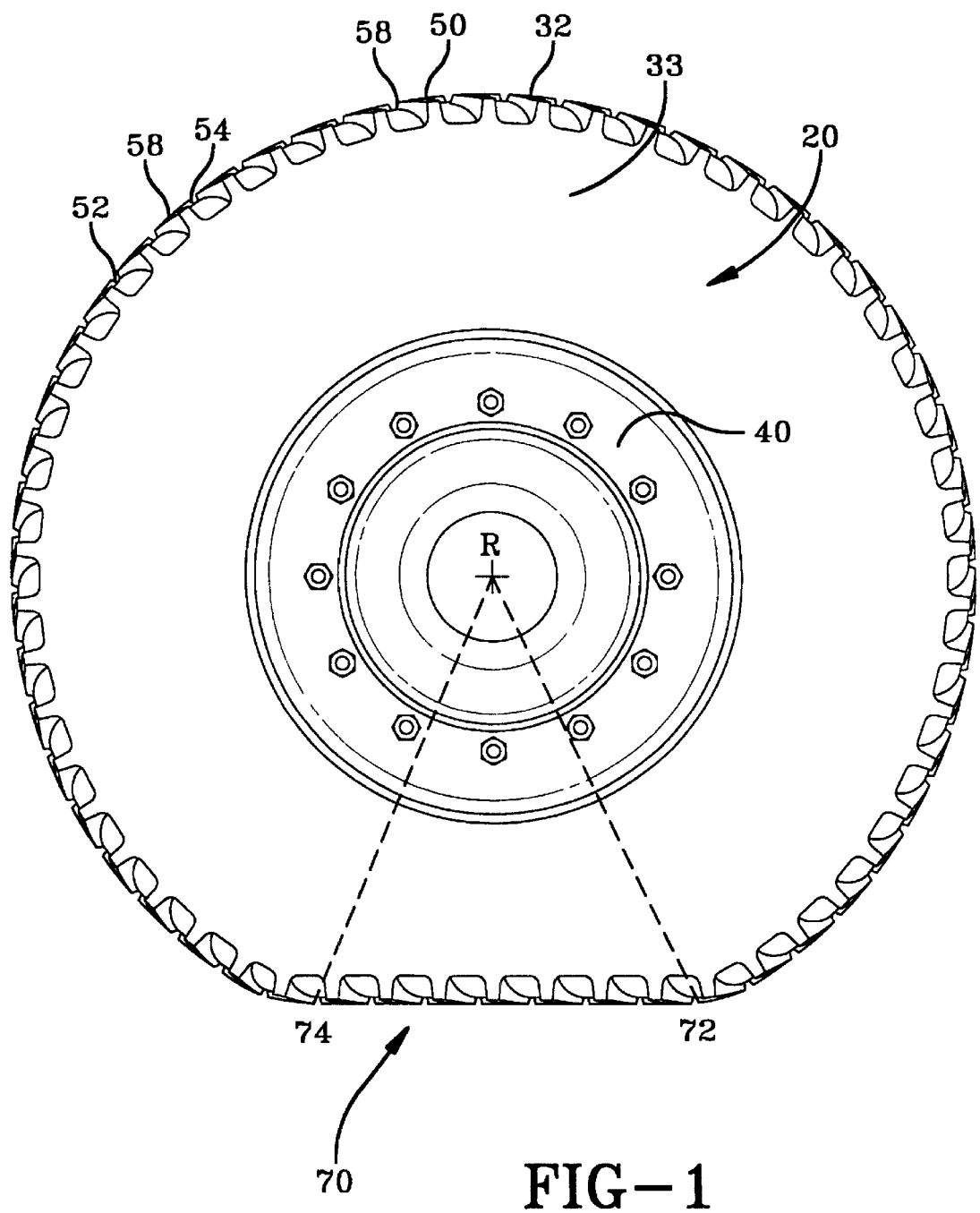
FIG. 1 is a side view of a first embodiment high aspect tire according to the invention.

As shown in FIG. 1, the tire 20 is illustrated in a condition simulating a soil working recommended inflated tire, the working inflation pressure under load is generally less than 16 psi.

As shown in FIG. 2, the maximum section height of the tire 20 is shown as (SH) the measured section width is (SW), the aspect being SH/SW ratio. When this ratio is 95% or greater, preferably 100% or greater, several very beneficial performance characteristics can be seen.

First and potentially foremost is the contact patch or footprint of the tire can be made substantially longer than normal or lower aspect ratio tires. This is true partly because the load carrying capacity can be held constant while the working inflation pressure is lowered relative to the normal aspect ratio tires. This is due in part to the increased air volume in the taller sidewalls 33 of the tire 20 of the present invention.

This is possible even if the engineer keeps the outside diameter (OD) of the tire 20 constant and the section width (SW) substantially the same as the conventional aspect ratio tire. This is accomplished by lowering the nominal rim diameter of the tire 20, thus increasing the tire sidewall 33. Alternatively, the OD of the tire 20 can be increased; however, in many applications the vehicle cannot accept larger OD tires.

As soon as the farmer can convert from conventional low aspect ratio tires to these inventive high aspect ratio tires, in addition to a longer footprint yielding more traction, he will reduce soil compaction because the same load is carried over more area creating a unit pressure drop between the tire and the soil as the tire rolls over the soil. This is most beneficial to reduce soil erosion and increasing crop yields.

A third benefit will be that the high aspect ratio tire will have a lower spring rate which will reduce the potential for "power hop" a phenomena wherein the tire when under load shears the soil at a point where the ability to resist the load is exceeded causing the tire to hop or bounce.

A fourth benefit is that the restrictive belt or breaker structure in the high aspect ratio tire 20 does not appreciably restrict the carcass plies from talking a natural inflated ply line. Conventional belts and breakers restrain the radial growth of the tire when it's inflated. This ply restraint was believed most beneficial to ride and handling performance at high speeds and has been in principle commonly applied to tractor or other off-road tires. This restriction of the plies from taking a more natural shape has resulted in numerous problems in the region near the belt edges causing high stresses and belt edge separations. For that reason the shorter sidewall normal aspect ratio tires are not well suited to operating at very low inflation pressures which only exacerbates the belt edge stresses. Whereas, the high aspect ratio tires 20 of the present invention have almost no or very much reduced stresses in the belt edges. This combined with the taller and thus more compliant sidewall 33 makes this inventive tire 20 ideal for low inflation pressure working conditions.

A problem of lateral stability of the tire 20 due to these tall sidewalls is addressed by variable belt or breaker angle control. Whereas normal aspect ratio radial agricultural tires have belt cord angles of 16° to 27° typically and bias tires have breaker cord angles of 25° to 65°. The inventors have found that an increase in angles of 2 or more degrees above those normally used in a tire of a given outside diameter will sufficiently increase the lateral stability of the tire without unduly increasing shear stresses along the belt edges. These higher angle belts when employed on low aspect ratio tires increase this shear stress and thus such angles are routinely avoided.

One of the ways the engineer can design these high aspect ratio tires is to use the normal tires outside diameter and thus set the nominal rim diameter to fit the smaller sized rims currently available. Alternatively special rims of smaller nominal rim diameters can be made. Examples of using smaller conventional rims is shown below:

| Conventional Tire OD | 77.1 | Rim Dia. 46 | Aspect Ratio 82 |
| High Aspect tire OD | 77.1 | Rim Dia. 38 | Aspect Ratio 104 |
| High Aspect Tire 2 OD | 77.1 | Rim Dia. 34 | Aspect Ratio 114 |
| High Aspect Tire 3 OD | 77.1 | Rim Dia. 30 | Aspect Ratio 125 |

These simple examples are shown to illustrate one application of the inventive concept. It is believed important that the nominal rim diameter be about 20 inches or more to insure there is enough tire to rim surface contact in the bead area to keep the tire 20 from slipping on the rim when subjected to high loads. Once the rim 40 becomes smaller than 20 inches, the inventive concept should be used in combination with an improved mechanical attachment of the tire beads to the rim, to avoid tire slipping.

With reference to FIG. 1, the tire 20 when inflated to a specific working pressure of 16 psi or less exhibits a higher radial deflection of the tire under load than the lower aspect ratio tire similarly loaded. This high deflection elongates the contact patch or footprint 70 of the tire 20 such that the leading end 72 to trailing end 74 are circumferentially spaced the tire as shown in the FIG. 1. This distance is substantially greater than a conventional aspect ratio tire of the same outside diameter and section width. Thus the distance Y increases with increasing aspect ratios of tires of the same OD and section width.

These high aspect ratio tires 20 appear like large doughnut when unloaded, but when loaded the elongated footprint 70 is clearly noticeable. The tire 20 flattens in this compressed footprint zone providing a wide flat tread 32 to provide traction and high flotation. This makes the vehicle perform somewhat like a tracked vehicle. What is so beneficial is that all of the complicated mechanism associated with tracked vehicles is not needed while all of the benefits of pneumatic tires 20 are retained such as a soft shock absorbing ride.

Figure 3:
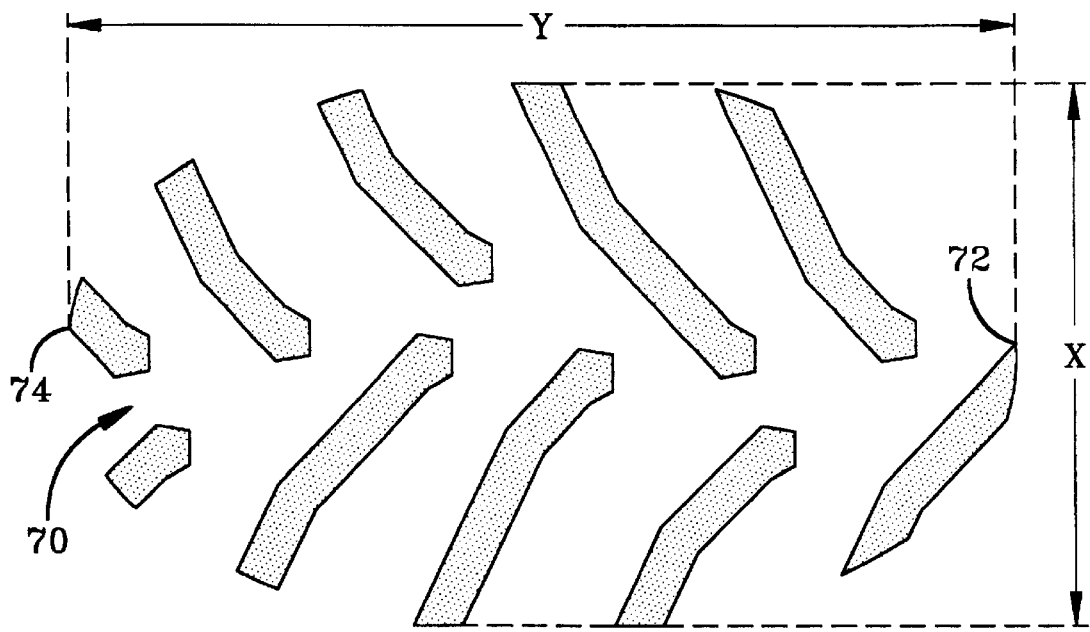
FIG. 3 is view of a contact patch of the high aspect tire taken from FIG. 1.
Figure 4:
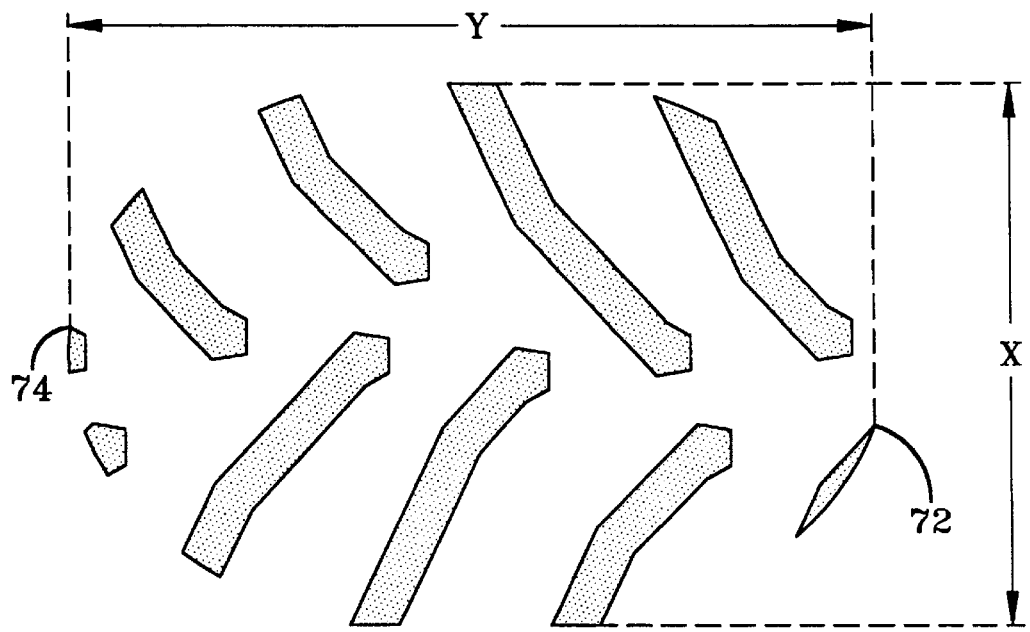
FIG. 4 is a plan view of a portion of the contact patch of a normal aspect ratio tire constructed similar to the tire of FIG. 1, but having an aspect ratio of less than 90%.
Figure 5:
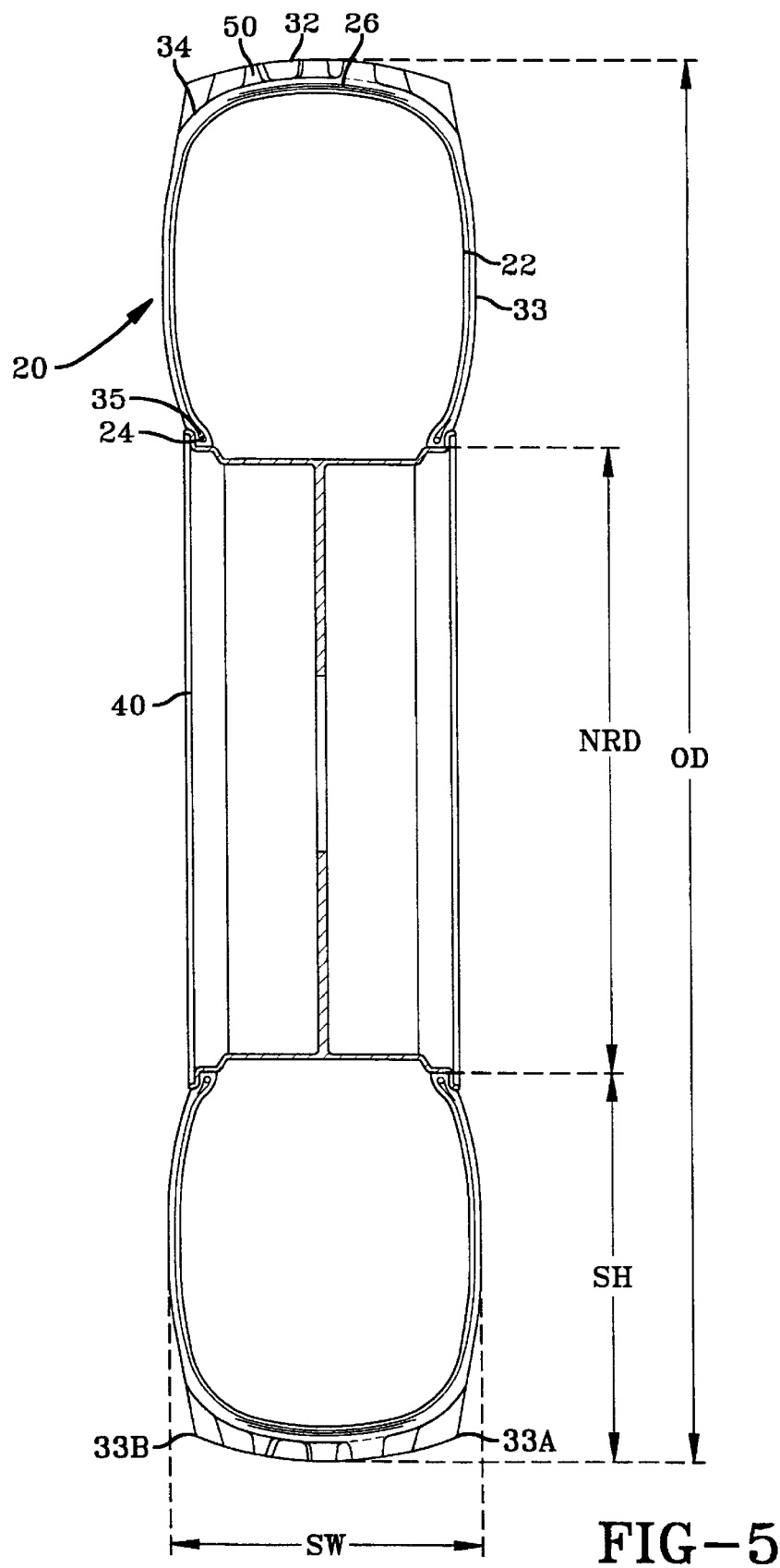
FIG. 5 is a perspective view of a second embodiment tire according to the invention.
Figure 6:
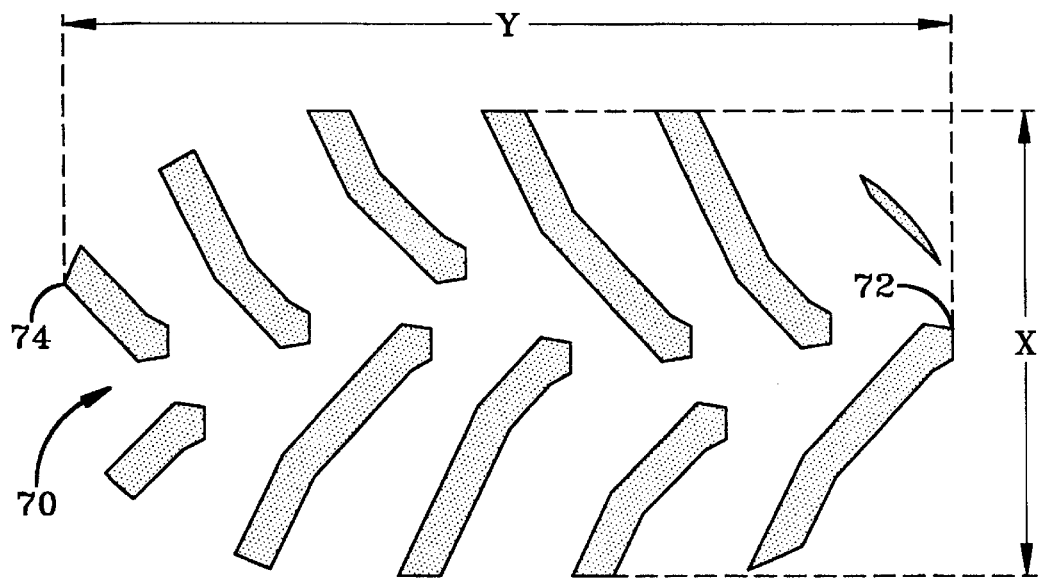
FIG. 6 is a plan view of a contact patch of the tire taken from FIG. 5.
Figure 7:
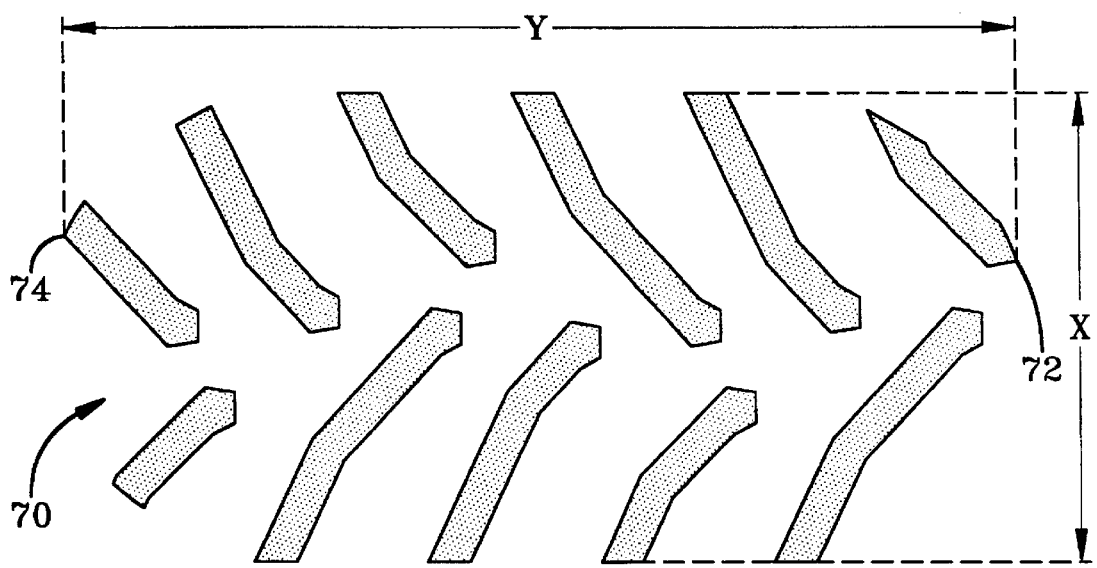
FIG. 7 is a plan view of a portion of the contact patch of the third embodiment tire according to the present invention.

With reference to FIG. 3, the contact patch 70 of a first embodiment high aspect ratio tire 20 is shown. FIG. 4 shows for comparison at the same load and pressures the footprint of a normal aspect ratio tire. FIGS. 6 and 7 are footprints 70 of second and third embodiment tires 20 each having aspect ratios of 114 and 125, respectively. As can be seen when inflated to a working pressure the contact patch 70 progressively increases in relation to the increasing aspect ratio. Furthermore, as the aspect ratio increased the load capacity increases when the working pressure is held constant. Thus for a constant or same load the farmer can further drop the working pressure from 12 to 9 psi to 9 or 6 psi. This reduced working pressure further deflects the tire 20 and substantially increases the contact patch circumferential length Y. One of the objectives is to improve the contact patch length Y without changing appreciably the tire contact patch width X. As can be seen the relative length increase of Y in the circumferential direction is much greater than the increase in width of Y and therefore the tires 20 are believed to have met this goal. The objective is to have the tire when inflated to less than 16 psi, to have a contact patch with axial width X and a circumferential length Y wherein the ratio of Y/X is greater than 1.

What is claimed is:

1. An agricultural tire for drive axle or axles of a vehicle, the tire being pneumatic and having an air chamber and having an axis of rotation, a nominal rim diameter of 20 inches (51 cm) or greater, a carcass, the carcass having at least one cord reinforced ply and a pair of annular bead cores, a belt reinforcing member having one or more belt or breaker plies radially outward of the carcass, a tread disposed radially outward of the carcass and the belt reinforcing member, the tread having a plurality elongated lugs, the tire being characterized by:

a high aspect ratio of 100% or greater, the aspect ratio being defined as the maximum section height of the tire divided by the maximum section width of the tire;

wherein the tire, when inflated to a working pressure of 16 psi (1.2 bar) to as low as 6 psi (0.4 bar) and normally loaded on a hard flat surface, has an elongated contact patch having an axial width of X and a circumferential length of Y; wherein the ratio of Y/X is at least greater than 1.0; and the belt or breaker plies of the belt reinforcing member having cords angled in the range of 18° to 29° for radial plies and cords angled in the range of 27° to 67° for bias plies, the belt reinforcing member being non-restricting relative to the carcass plies so that when the tire is inflated but unloaded the at least one cord reinforced ply of the carcass takes a natural inflated ply line wherein the lugs are spaced between a pair of lateral edges, each lug has a radially outer contact surface area, the sum of the radially outer contact surface areas between the lateral edges as measured around the total circumference is less than 40%.

2. The agricultural tire of claim 1 wherein the aspect ratio is greater than 100%.

3. The agricultural tire of claim 1, wherein the tire has a nominal rim diameter of 38 inches (96 cm) or 34 inches (36 cm) or 30 inches (76 cm) and a corresponding aspect ratio of 104, 114 or 125 respectively.

* * * * *